(12) United States Patent
Wilson

(10) Patent No.: US 10,654,751 B2
(45) Date of Patent: May 19, 2020

(54) POLYMER MODIFIED CEMENT ADHESIVE FOR PROVIDING HIGH FRICTION SURFACING

(71) Applicant: W. Robert Wilson, Mountain Lakes, NJ (US)

(72) Inventor: W. Robert Wilson, Mountain Lakes, NJ (US)

( * ) Notice: Subject to any disclaimer, the term of this patent is extended or adjusted under 35 U.S.C. 154(b) by 0 days.

(21) Appl. No.: 15/605,684

(22) Filed: May 25, 2017

(65) Prior Publication Data
US 2018/0037500 A1    Feb. 8, 2018

Related U.S. Application Data

(60) Provisional application No. 62/341,124, filed on May 25, 2016.

(51) Int. Cl.
| | |
|---|---|
| *C04B 14/28* | (2006.01) |
| *C04B 16/06* | (2006.01) |
| *C04B 28/04* | (2006.01) |
| *C04B 28/02* | (2006.01) |
| *C08L 31/04* | (2006.01) |

(Continued)

(52) U.S. Cl.
CPC ........ *C04B 14/285* (2013.01); *C04B 16/0625* (2013.01); *C04B 16/0641* (2013.01); *C04B 28/02* (2013.01); *C04B 28/04* (2013.01); *C04B 2103/0057* (2013.01); *C04B 2111/00146* (2013.01); *C04B 2111/00362* (2013.01); *C04B 2111/00482* (2013.01); *C04B 2111/60* (2013.01); *C08L 23/06* (2013.01); *C08L 31/04* (2013.01)

(58) Field of Classification Search
CPC .............. C04B 14/285; C04B 16/0641; C04B 16/0625; C04B 2111/06; C04B 28/02; C04B 28/04; C04B 2111/00146; C04B 2111/00362; C04B 2111/00482; C04B 2111/60; C08L 23/06; C08L 31/04
USPC .............. 404/17, 27–31, 72, 75, 76, 82, 101, 404/105–111
See application file for complete search history.

(56) References Cited

U.S. PATENT DOCUMENTS

| | | | | |
|---|---|---|---|---|
| 3,869,417 A | * | 3/1975 | Ramsay | ................. C08L 95/00 442/90 |
| 3,870,426 A | * | 3/1975 | Kietzman | ............... E01C 7/262 106/282 |

(Continued)

*Primary Examiner* — Raymond W Addie
(74) *Attorney, Agent, or Firm* — Douglas J. Ryder; Ryder, Mazzeo & Konieczny LLC

(57) ABSTRACT

A dry polymer modified cement to receive topical aggregate to form a high friction surface on trafficked pavement substrates (asphalt, concrete). The dry polymer modified cement is a thin overlay that handles the load of traffic in a relatively short time and has a relatively long life cycle. Prior to curing, the dry polymer modified cement also acts as an adhesive layer to receive and hold aggregate that is applied thereto. The dry polymer modified cement is prepared by mixing a cement mix with water where the cement mix includes cement (ordinary Portland cement), dry polymers and aggregate. The aggregate may have gradations that meet the ASTM C144 specification or may have finer gradations to allow for easier penetration of the topical aggregate by the dry polymer modified cement. The high friction surface may be patterned to provide improved performance.

20 Claims, 4 Drawing Sheets

(51) Int. Cl.
  *C04B 111/00* (2006.01)
  *C08L 23/06* (2006.01)
  *C04B 103/00* (2006.01)
  *C04B 111/60* (2006.01)

(56) References Cited

U.S. PATENT DOCUMENTS

| | | | | |
|---|---|---|---|---|
| 4,407,676 | A * | 10/1983 | Restrepo | C04B 16/0608 |
| | | | | 106/657 |
| 5,447,752 | A * | 9/1995 | Cobb | B44F 9/04 |
| | | | | 264/31 |
| 7,607,859 | B2 * | 10/2009 | Shaw | E01C 7/085 |
| | | | | 404/72 |
| 8,864,409 | B2 * | 10/2014 | Parker | E01C 19/43 |
| | | | | 404/75 |
| 10,221,527 | B2 | 3/2019 | Wilson | |
| 2004/0159073 | A1 * | 8/2004 | Palermo | C04B 41/533 |
| | | | | 52/745.19 |
| 2004/0226482 | A1 * | 11/2004 | Johansen, Jr. | C04B 7/246 |
| | | | | 106/712 |
| 2008/0287570 | A1 * | 11/2008 | Thayer | C04B 26/26 |
| | | | | 524/5 |
| 2011/0189456 | A1 * | 8/2011 | Reck | C04B 28/02 |
| | | | | 428/220 |
| 2011/0297047 | A1 * | 12/2011 | Rice | C04B 7/527 |
| | | | | 106/643 |
| 2014/0199553 | A1 * | 7/2014 | Sadler | B28B 1/002 |
| | | | | 428/446 |
| 2014/0272302 | A1 * | 9/2014 | Ciuperca | B44C 5/04 |
| | | | | 428/150 |
| 2016/0024723 | A1 * | 1/2016 | Wilson | E01C 9/001 |
| | | | | 404/19 |
| 2018/0094392 | A1 * | 4/2018 | Wilson | E01C 23/09 |

* cited by examiner

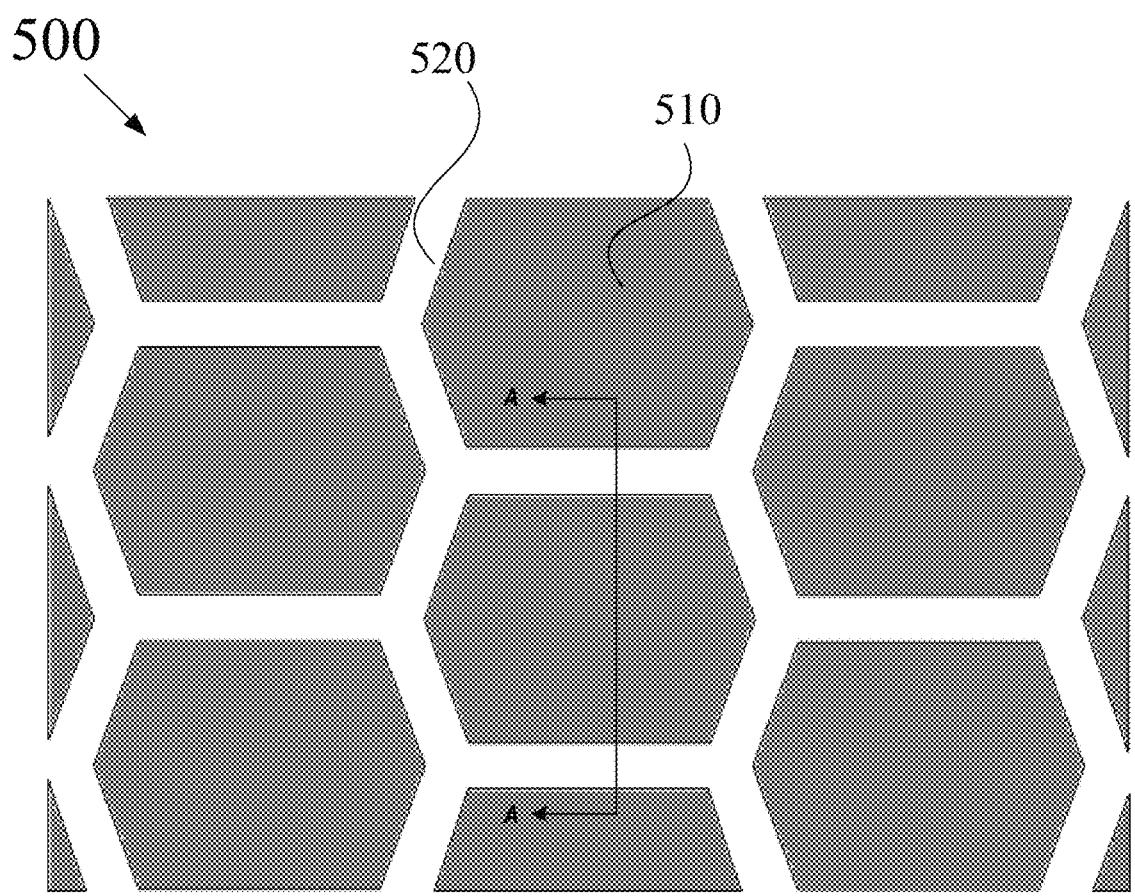
*FIG. 5A*
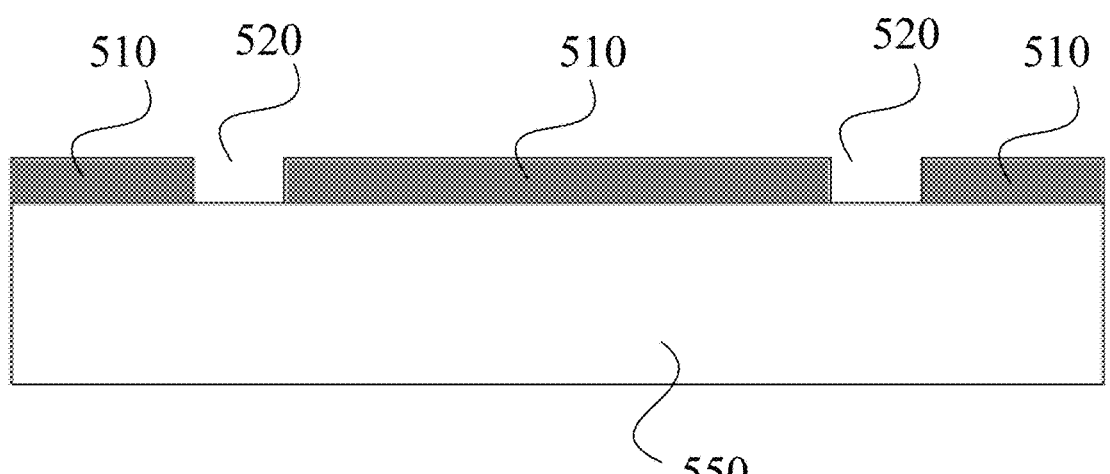
*FIG. 5B (section A-A)*

POLYMER MODIFIED CEMENT ADHESIVE FOR PROVIDING HIGH FRICTION SURFACING

BACKGROUND

Pavement surfaces, such as asphalt and concrete, are used to carry traffic, including vehicles (e.g., automobiles, bikes, construction equipment) and humans. Pavement surfaces may need additional friction on portions thereof (e.g., sections with cornering, sections where braking is required) to increase the safety of the traffic traveling thereon. The additional friction is known as high friction surfacing. The high friction surfacing may be provided by placing an adhesive material on the underlying pavement surface (substrate) and then securing aggregate to the adhesive. The adhesive layer is typically a wet polymer layer, such as epoxy, polyurethane, or bitumen. The adhesive layer is applied (overlaid) on the substrate and then aggregate is applied onto the adhesive layer prior to the adhesive layer curing.

The materials typically used as the adhesive layer undergo changes in their properties when there are changes in temperature. Bitumen and the substrate layer (concrete or asphalt) are thermally compatible, meaning that their dimensional properties change at the same rate with changing temperatures. However, epoxy/polyurethane and the substrate layer are thermally incompatible, meaning that their dimensional properties change at different rates. The thermal incompatibility may result in delamination of the epoxy/polyurethane from the pavement surface or damage to the pavement surface.

In addition, the adhesive materials undergo changes in their properties as the materials age. For example, epoxies/polyurethanes will experience steric hardening as does asphalt. Bitumens will age harden through loss of volatiles. Furthermore, the adhesive layers may break down over time due to, for example, continued exposure to UV light.

The existing adhesive materials utilized for high friction surfacings (e.g., bitumen, epoxies, polyurethanes) are installed full width and rely totally on the size and nature of the aggregate to provide the macro and microtexture to provide friction. These surfaces are therefore highly susceptible to rainfall intensity.

BRIEF DESCRIPTION OF THE DRAWINGS

The features and advantages of the various embodiments will become apparent from the following detailed description in which:

FIGS. 5A-B illustrate top and cross sectional views of a patterned high friction surface applied over a substrate, according to one embodiment.

DETAILED DESCRIPTION

Figure 1:
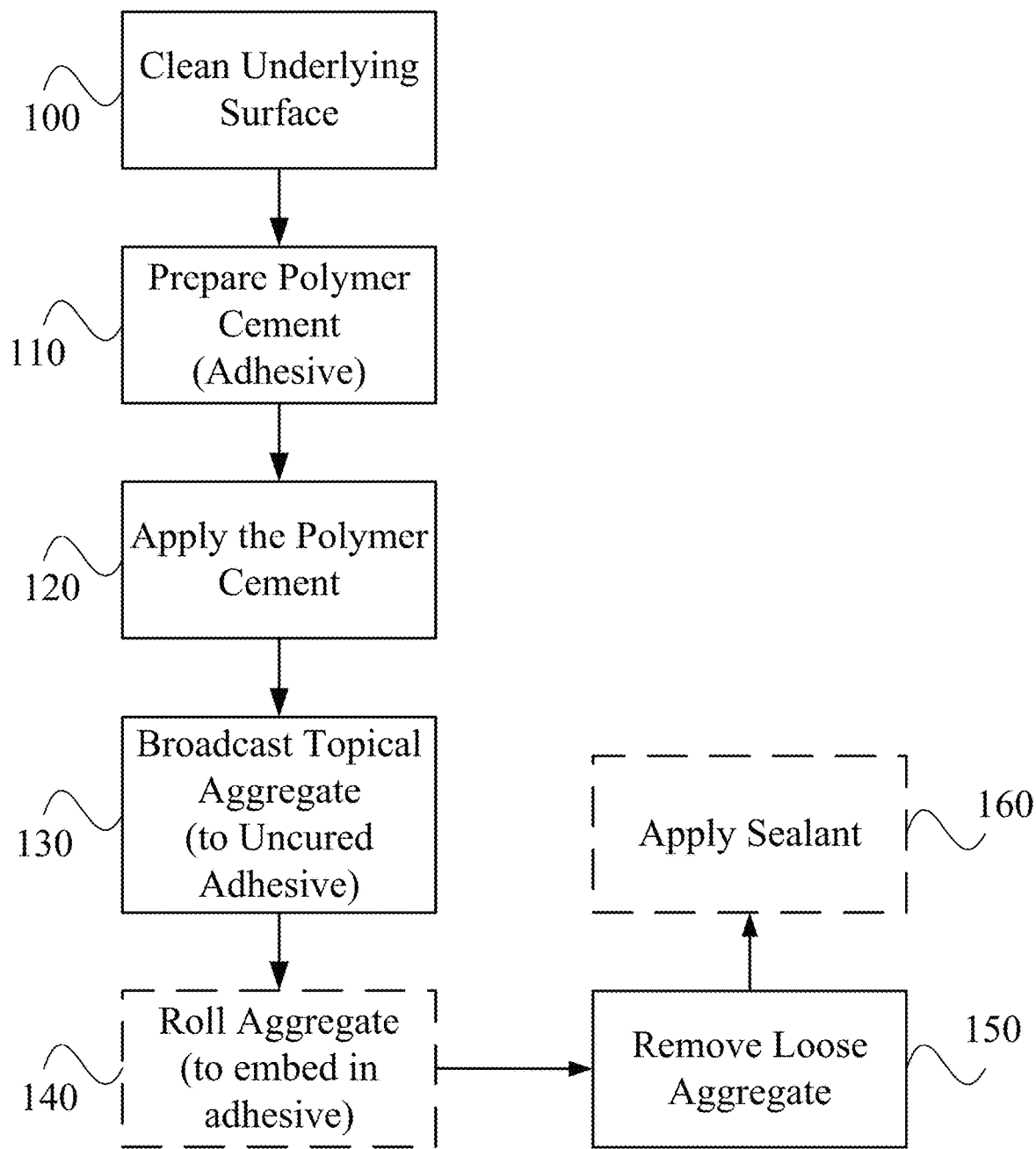
FIG. 1 illustrates an example flow chart for providing a high friction surface on a pavement surface, according to one embodiment.

Cement blends (e.g., concrete, mortar) typically include cement (e.g., ordinary Portland cement), aggregate (e.g., sand or other aggregate having gradations that meet the ASTM C144 specification) and possibly other materials (e.g., microfibers, plasticizer, filler, accelerator, retarder). The cement blends are mixed with water and then the cement mixture is applied to the desired location. Polymers may be added to the cement mixtures to create polymer modified cements. The addition of the polymers may be to, for example, increase flexibility, increase workability, increase bond with underlying substrate and/or form a tough and long-wearing surface.

The polymer modified cements may be used as, for example, overlay layers on pavement surfaces (concrete or asphalt). The polymer modified cements may be applied as a fairly thin layer (as thin as ⅛ inch) over the pavement surface and are able to receive traffic and are durable on their own. The polymer modified cement overlays may be used to preserve the underlying pavement surface. The polymer modified cements have become more popular with the increase in the expense of asphalt.

Prior to curing, the polymer modified cements may also act as an adhesive layer (similar to epoxy, polyurethane, and bitumen) and be capable of receiving aggregate in order to provide high friction surfacing on the pavement surfaces. The use of polymer modified cements as an adhesive layer is beneficial since in addition to securing the aggregate to provide high friction surfacing it preserves the underlying pavement surface.

The polymers used in the polymer modified cements may be, for example, acrylic latex polymers (wet polymers). The polymer modified cements may be formed by combining a wet polymer mixture with a cement mixture (e.g., cement, aggregate and water). The cement mixture, and possibly the polymer mixture, is formed on site and then the wet polymer mixture and the cement mixture are combined on site.

The use of wet polymers may result in a polymer modified cement having air voids. The air voids may lead to the polymer modified cement being porous. If the polymer modified cement is used as an overlay, the porous layer may enable water to reach the underlying pavement surface without a means of escape. Furthermore, the air voids may result in the polymer modified cement overlay being more susceptible to freeze thaw, wear, abrasion and friction loss. Moreover, the use of wet polymers may result in a thin polymer layer forming on the surface and depending on the temperature and humidity during installation may have accelerated curing compared to the rest of the polymer cement layer which commonly results in surface tension cracks.

Polymer modified cements may also be formed using dry polymers (e.g., polymer powders). The dry polymers may be mixed with the cement blend (e.g., cement, aggregate) to create a dry polymer modified cement blend. The use of a dry polymer improves the quality control during the mixing of the product on site as the dry polymer modified cement blend may be delivered to the site and simply require the addition of water which simplifies the mixing and placing operation on site.

The dry polymer modified cements will not typically have some of the issues associated with the wet polymer modified cements (e.g., air voids, surface tension cracks). The dry polymers may be redispersible binders. According to one embodiment, the redispersible binders may be based on a copolymer of vinyl acetate and ethylene. The redispersible polymer may also include defoaming and self-leveling properties to assist with the reduction of air during the mixing process that is common with the use of wet polymer cements as noted above. The reduction of air improves the impermeability of the surface mix and increases the abrasion resistance of the cured material.

According to one embodiment, the dry polymer modified cement may include cement (e.g., ordinary Portland cement), dry polymer (e.g., redispersible binders based on a copolymer of vinyl acetate and ethylene) and aggregate (e.g., sand or other aggregate having gradations that meet the ASTM C144 specification). The aggregate is used to provide layer thickness, to improve mixing, limit segregation and may provide a rough surface that can increase skid resistance. Using aggregate gradations that meet the ASTM C144 specification produces a polymer modified cement that can be placed relatively thin (e.g., >3 mm, >⅛ in). The ASTM C144 specification provides an optimum gradation that is intended to consume a moderate quantity of cement, produces a wet mix that is workable without having to use too much water or additives, does not shrink excessively, and cures at an appropriate rate to allow a bond to develop with the underlying substrate.

According to one embodiment, the dry polymer modified cement may also include microfibers to limit segregation, shrinkage and exothermal generation and improve workability. The microfibers may be polypropylene microfibers. The microfibers may be between approximately $1/16^{th}$ of an inch to 1 and ½ inches long.

According to one embodiment, the dry polymer modified cement may also include additives. The additives may include, for example, a plasticizer to increase workability additives may include a filler, such as a pozzolanic filler. The filler increases workability, limits segregation and shrinkage and increases long term compressive strength. The filler may be fly ash, such as class C or class F fly ash.

According to one embodiment, the additives may include an accelerator to increase curing process that may be needed for night time applications and time sensitive applications. According to one embodiment, the additives may include a retarder along with the accelerator to delay the change in workability that comes from adding the accelerator.

The dry polymer modified cement mix may be delivered to the site with all the necessary elements mixed together at the appropriate proportions for the job at hand. The dry polymer modified cement may be prepared by mixing an appropriate amount of dry polymer modified cement mix with an appropriate amount of water.

The dry polymer modified cement may be applied using standard processes, such as screeding or spraying. The topical aggregate used to provide the high friction surfacing may be applied by broadcasting the aggregate onto the dry polymer modified cement layer prior to the dry polymer modified cement curing. The topically applied aggregate is preferably broadcast by mechanical means. Alternatively, the topically applied aggregate is broadcast by hand.

According to one embodiment, a single vehicle, or affiliated complimentary vehicles, may be utilized to spray the dry polymer modified cement onto the pavement surface and to drop (broadcast) the aggregate onto the uncured dry polymer modified cement. The vehicle may include storage units for housing the aggregate behind the portion of the vehicle where the dry polymer modified cement is sprayed. The storage units may be capable of dropping (broadcasting) the aggregate.

Alternatively, the dry polymer modified cement may be poured on the pavement surface and squeegeed to form a uniform thickness and then the aggregate may be broadcast thereon.

The topically applied aggregates include, but are not limited to, bauxite, crushed granite and slag. The type and/or size of topical aggregate utilized may be based on the use of the pavement surface. The topically applied aggregates may have varying sizes (e.g., 2.65 mm, 4.75 mm, 6.3 mm). Different aggregates may be utilized in different portions of the pavement surface if, for example, different degrees of friction are required. Depending on the size of the aggregate utilized, a light roller might be required to seat the aggregate in the dry polymer modified cement.

The dry polymer modified cement may be applied over both asphaltic and concrete surfaces, including sealcoats; single chip, double chip or cape seals; all asphalt slurry types; all asphalt microsurfacings, thin hot mix flexible asphalt pavement surfaces with high surface deflections (≥0.8 mm deflection); thick hot mix flexible asphalt pavement surfaces with low surface deflections (≤0.8 mm deflection); all Portland cement concrete pavements; roller compacted concrete; and whitetopping.

FIG. 1 illustrates an example flow chart for providing a high friction surface on a pavement surface. Initially the underlying pavement surface must be prepared 100. The pavement surface should be clean and dry to ensure proper adhesion of the polymer modified cement. Any loose dust or dirt should be removed. Typically, the loose dust or dirt can be removed with blowers (e.g., industrial blowers). However, if the pavement surface is soil contaminated, then the surface may require pressure washing. Any wet spots, oil spots, dirt, curing compounds and any films should be removed as part of the surface preparation. According to one embodiment, all pavement marking materials may be removed, or masked, using an appropriate technique (e.g., shot blasting, high pressure water blasting, grinding).

During the preparation of the pavement surface, the polymer modified cement (adhesive layer) may be mixed or prepared in accordance with the manufacturer's recommendations and instructions 110. The polymer modified cement is then applied onto the clean pavement surface using standard processes 120. Preferably, the polymer modified cement is sprayed on using a spray gun, or spray bar, to achieve uniform thickness. Supplementally, the polymer modified cement may be further leveled or distributed with a "drag box" apparatus. The topically applied aggregate is then broadcast onto the uncured adhesive layer 130. The topically applied aggregate may be rolled over to ensure that the aggregate is seated into the polymer modified cement (adhesive layer) 140. It should be noted that the rolling of the topical aggregate may not be required/desired for every application and is therefore an optional step that is illustrated as dashed box.

After the high friction surface (polymer modified cement and topical aggregate) is cured, any loose topical aggregate is then removed by, for example, using hand held brooms, or by a mechanical broom, or by using a vacuum truck 150. Where appropriate, or where specified, a curing agent or sealant may be applied after the high friction surface has cured 160. The curing agent or sealant should be spray applied, and then to ensure uniform coverage, a roller should be used to spread the sealant uniformly. It should be noted that the application of a curing agent/sealant may not be required/desired for every application and is therefore an optional step that is illustrated as dashed box.

It should be noted that the example flow chart is not intended to limit the steps required to form a high friction surface to the order defined. Rather, steps may be added, deleted, combined, separated and/or the order of the steps may be modified without departing from the scope of the current invention. The invention is intended to cover the various manners in which a high friction surface may be formed on a pavement surface.

The use of aggregate (e.g., sand) gradations that meet the ASTM C144 specification may limit the thinness of the adhesive layer that may be applied (the thickness cannot be reduced to allow a thinner adhesive layer to be applied). Accordingly, smaller topically applied aggregate could be absorbed fully into the adhesive layer thus not providing a friction surface (additional surface area). Furthermore, the gradation and particle size of aggregate meeting the ASTM C144 specification relative to the adhesive layer thickness produces an aggregate matrix that may resist the penetration of certain topically applied aggregates (e.g., larger aggregates). Accordingly, rolling may be required if the aggregate is desired to penetrate the adhesive layer rather than simply be secured to, or sit on, the adhesive layer.

Figure 2:
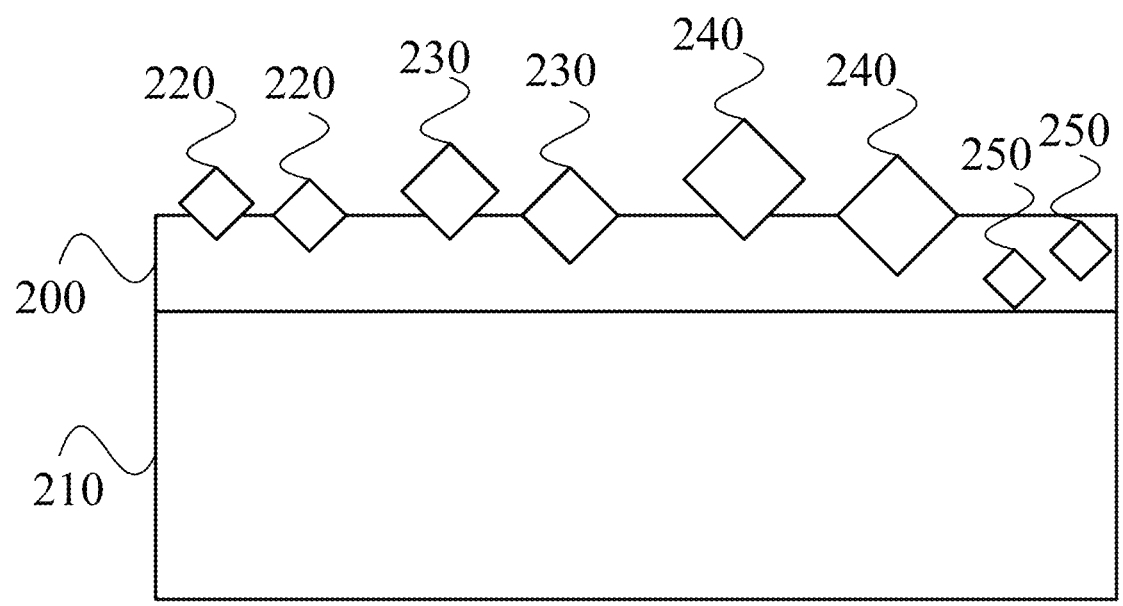
FIG. 2 illustrates an example application of topical aggregates to an adhesive layer to create a high friction surface, according to one embodiment.

FIG. 2 illustrates an example application of topical aggregates to an adhesive layer 200 to create a high friction surface. The adhesive layer 200 is a dry polymer modified cement that is applied on a pavement surface 210 as a relatively thin layer. The thickness (or more accurately the thinness) of the adhesive layer 200 may be limited at least somewhat by the C144 aggregate that is utilized in the layer. The topical aggregate is illustrated as diamonds for ease of illustration and is in no way intended to be limited thereby. Two each of several different size topical aggregates 220, 230, 240, 250 are illustrated, but is in no way intended to suggest anything regarding the size, amount, combination or configuration of the topical aggregate. The larger size aggregates 220, 230, 240 are illustrated as not adequately penetrating (being received by) the adhesive layer 200. As illustrated, a substantial portion of the topical aggregates 220, 230, 240 are seated above the adhesive layer 200. The smaller size aggregate 250 is illustrated as being completely received within the adhesive layer 200 so that the aggregate 250 does not provide additional surface area on an upper surface of the adhesive layer (a high friction surface).

The use of a finer grain aggregate, such as dust, in the dry polymer modified cement mix may enable topical aggregate to more easily penetrate the dry polymer modified cement (adhesive layer). There are no ASTM standards for polymer modified cement mixes that use finer grain aggregate, as the resulting product is assumed to consume high quantities of cement and polymer due to the increased surface area produced by the ultrafine aggregate (e.g., dust).

A dry polymer modified cement mix (adhesive) may utilize marble dust, or other dust, to replace the ASTM C144 aggregate (sand) in order to enable easier penetration of topical aggregate. The finer grain dry polymer modified cement (adhesive layer) uses optimized amounts of cement, water, and polymer based on the surface area of the finer aggregate. The finer grained dry polymer modified cement adhesive layer produces a very workable mix, that delivers good bond, acceptable strength, minimal shrinkage and excellent stone retention.

The use of the ultrafine material (e.g., marble dust) instead of sand gradations that meet the ASTM C144 specification not only enables the penetration of topically applied aggregates but also creates an adhesive layer that is compatible with both concrete and asphalt pavement materials and is thermally stable over a wide range of temperatures, does not age, and does not steric harden. The finer grain dry polymer cement produces an adhesive that can be installed in lifts of 1/16 of an inch or greater, and still be able to receive topically applied aggregates.

Figure 3:
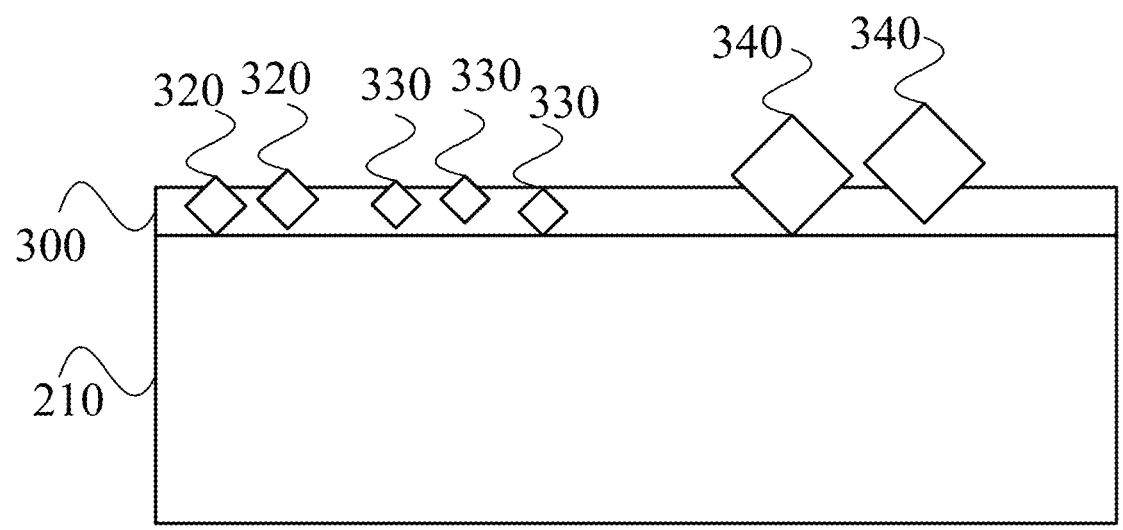
FIG. 3 illustrates an example application of topical aggregates to an adhesive layer to create a high friction surface, according to one embodiment.

FIG. 3 illustrates an example application of topical aggregates to an adhesive layer 300 to create a high friction surface. The adhesive layer 300 is a finer grain dry polymer modified cement that is applied on a pavement surface 210 as a relatively thin layer. The thickness of the adhesive layer 300 may be thinner than the adhesive layer 200 as it is not limited by the C144 aggregate that is utilized in the layer. The topical aggregate is illustrated as diamonds for ease of illustration and is in no way intended to be limited thereby. A plurality of each of several different size topical aggregates 320, 330, 340 are illustrated, but is in no way intended to suggest anything regarding the size, amount, combination or configuration of the topical aggregate. The smaller size aggregates 320, 330 are illustrated as adequately penetrating (being received by) the adhesive layer 300. A substantial portion of the topical aggregates 320, 330 are seated in the adhesive layer 200. The larger size aggregate 340 is illustrated as being larger than the thickness of the layer 300 so that it cannot be substantially received within the adhesive layer 300 (a substantial portion is located above the adhesive layer 300). Some larger sized aggregates may not be able to be used with thinner layers of adhesive 300.

The nature of the dry polymer modified cement allows for a hybrid high friction surface where aggregate intermixed with the dry polymer modified cement adhesive layer (e.g., C144 aggregate, finer grain aggregate) and topically applied aggregate both provide friction. The intermixed aggregate provides the macrotexture friction (across the overall layer) and the topical aggregate provides microtexture friction (surface of the topically applied aggregate).

The dry polymer modified cement (adhesive layer) and the high friction surface formed by applying a topical aggregate thereto, may still be thermally incompatible with the underlying pavement surface (both asphalt and concrete). The thermal incompatibility may lead to the layers flexing, expanding and the like at different times and to different degrees. This may cause delamination of the high friction surface from the underlying pavement surface and/or damage to the high friction surface and/or underlying pavement surface.

In order to reduce the effect of the thermal incompatibility, the continuous amount of surface area where the two layers overlap may be limited. The limited overlap limits the strain caused from the thermal incompatibility from building up between the two surfaces. Limiting the amount of continuous surface area may be accomplished by patterning the high friction surface so that uniform gullies (e.g., grout lines) are located between the patterns. The use of patterns and gullies limits the amount of continuous contact between the two layers to the patterns formed in the high friction surface. The thermally developed strain that may build up between a high friction surface pattern and the underlying surface may be relieved at the location of the gullies. Limiting the accumulation of strain may prevent delamination and stress to the underlying surface that can cause cracking and eventually failure of the underlying surface.

A shrinkage crack that develops in the underlying surface, will likely form in the gulley (may be limited to forming in the gulley). Limiting the damage (e.g., cracks) to the underlying surface to within the gullies may prevent future more severe damage to the high friction surface and thereby failure of the underlying surface. Additionally, a crack formed within a gully will not be felt by traffic traversing the riding surface or be visually seen.

The patterns may be formed by using stencils. The stencils may be pre-manufactured to produce the desired pattern shape, size and thickness. The stencils may be made from, for example, paper, metallic materials, plastic, synthetic materials or some combination thereof. The shapes, size and thickness of the patterns (shapes formed within the overlay) may be dictated based on, for example, the look desired and the primary use of the overlay.

The use of patterns and gullies provides additional benefits other than stress relief. For example, the gullies provide a means for water run-off and thus reduces the amount of standing water on the riding surface. That is, the water enters the gullies rather than pooling on the riding surface. If the gullies extend to the edge of the high friction surface, the water may follow the gullies to the end of the high friction surface and escape therefrom. The reduction of water on the riding surface reduces the amount of water that may spray up as a vehicle traverses the riding surface and also increases the effective friction of the riding surface. This increases the safety of the pathway at times when the high friction surface may be inundated with water (e.g., during inclement weather such as when it's raining). The patterns also provide macro as well as micro texture using the topically applied aggregate to deliver the best wet friction testing performance, making them much more effective in a high rainfall intensity event.

Moreover, the patterned high friction surface may provide noise reduction for traffic tire noise. The gullies may also provide sound reduction by, for example, capturing some of the sound of the traffic (e.g., sound of tires traversing the riding surface) therein and/or reducing the amount of contact between, for example, the tires and the high friction surface and thus reduce the amount of noise generated.

According to a preferred embodiment, the shapes utilized for the patterns may prevent the gullies from aligning together to form a long gulley that may create an extended stress line and/or result in different spacing of gullies based on direction the riding surface is being traversed. That is, the patterns utilized may form non-directional gullies. Effective patterns may have multiple sides that will result in gullies not traversing the same path when placed side by side. For example, hexagons and/or octagons may result in non-directional gullies that do not extend further than a side of one pattern.

Figure 4:
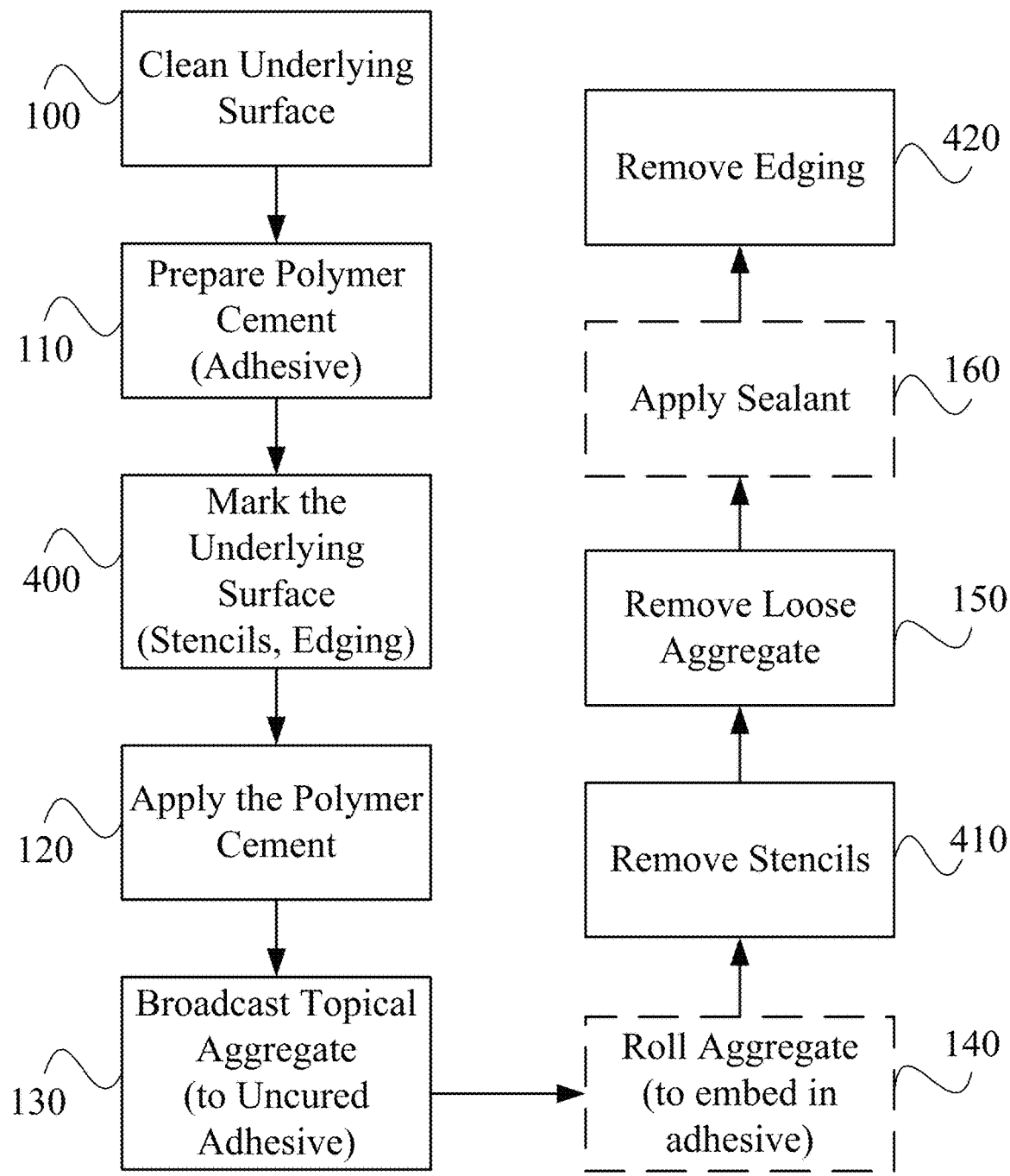
FIG. 4 illustrates an example flow chart for providing a patterned high friction surface on a pavement surface, according to one embodiment.

FIG. 4 illustrates an example flow chart for providing a patterned high friction surface on a pavement surface. The flow chart is similar to the flow chart of FIG. 1 for providing a high friction surface but includes additional steps for patterning the high friction surface. Initially the underlying pavement surface must be prepared 100. The polymer modified cement adhesive layer (e.g., C144 aggregate, finer grain aggregate) may be mixed or prepared in accordance with the manufacturer's recommendations and instructions 110. The underlying pavement surface should be clearly marked out in accordance with the plan (e.g., drawings, engineering instructions) 400. The boundary of the area (e.g., curbs, utility boxes) to be surfaced may be taped using, for example, 6" wide duct tape. The stencils are then placed to produce the desired pattern. The individual stencils may require being attached to each other or the pavement to ensure that they do not move while they are trafficked by the work crews and or due to wind.

Once the stencils cover sufficient area, the polymer modified cement is then applied onto the clean pavement surface using standard processes 120. The topically applied aggregate is then broadcast onto the uncured adhesive layer 130. The topically applied aggregate may be rolled over to ensure that the aggregate is seated into the polymer modified cement (adhesive layer) 140. It should be noted that the finer grain polymer modified cement should allow the aggregate to more easily penetrate the layer and therefore the rolling of the topical aggregate should be less often required.

The stencils are removed once the dry polymer cement has cured to a point when the stenciled pattern can maintain its shape integrity to allow defined gullies to promote water runoff and substrate strain relief paths 410. The stencil can be re-used to continue the operation depending on the staging requirements. Any masking or edging tape should be removed immediately after the stencils to ensure sharp edges.

After the high friction surface (polymer modified cement and topical aggregate) is cured, any loose topical aggregate is then removed 150. Where appropriate, or where specified, a curing agent or sealant may be applied after the high friction surface has cured 160. Once the curing agent or sealant has fully cured, then the edging can be removed 420 and traffic can then be allowed onto the surface.

It should be noted that the example flow chart is not intended to limit the steps required to form a high friction surface to the order defined. Rather, steps may be added, deleted, combined, separated and/or the order of the steps may be modified without departing from the scope of the current invention. The invention is intended to cover the various manners in which a high friction surface may be formed on a pavement surface.

According to one embodiment, rather than using stencils to create the patterns and gullies in the high friction surface, the gullies may be formed in the adhesive layer by blowing air or liquid onto the adhesive layer before it cures to create the gullies (and thus the patterns). The gullies may be formed before or after the topical aggregate is applied.

FIGS. 5A-B illustrate top and cross sectional views of a patterned high friction surface 500 applied over a substrate 550. The patterned high friction surface 500 includes a plurality of dry polymer patterns 510 separated by a plurality of gullies 520.

The dry polymer modified cement may be colored different colors depending on the use of the high friction surface. For example, cross walks may be colored red, bike paths green, and dividing lines yellow. If the pathway requires multiple colors a first color will be applied and then the first color will be masked when the second color is applied. For example, the yellow stripes in a roadway may be applied first and then they may be masked when the rest of the roadway is applied.

Although the invention has been illustrated by reference to specific embodiments, it will be apparent that the invention is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

The invention claimed is:

1. A thin dry polymer modified cement adhesive overlay on a trafficked pavement substrate that enables a plurality of vehicles to traverse thereover on a consistent basis, wherein the trafficked pavement substrate can be either a concrete surface or an asphalt surface, the thin dry polymer modified cement adhesive overlay comprising
   a dry polymer modified cement mixture including Portland cement, polymer powders and ultrafine aggregate, wherein the ultrafine aggregate has a finer granularity than aggregate typically used with cement such as the aggregate defined in ASTM C144 specification; and water, wherein when the dry polymer modified cement mixture is mixed with the water it creates a dry polymer modified cement adhesive that is applied directly to the trafficked pavement substrate as a thin layer to create the thin dry polymer modified cement adhesive overlay on the trafficked pavement substrate.

2. The thin dry polymer modified cement adhesive overlay of claim 1, wherein the ultrafine aggregate in the dry polymer modified cement mixture is marble dust.

3. The thin dry polymer modified cement adhesive overlay of claim 1, wherein the polymer powders in the dry polymer modified cement mixture are redispersible binders.

4. The thin dry polymer modified cement adhesive overlay of claim 3, wherein the redispersible binders are based on a copolymer of vinyl acetate and ethylene.

5. The thin dry polymer modified cement adhesive overlay of claim 1, wherein the dry polymer modified cement mixture further includes microfibers to limit segregation, shrinkage and exothermal generation and improve workability.

6. The thin dry polymer modified cement adhesive overlay of claim 5, wherein the microfibers are between approximately $1/16^{th}$ of an inch to 1 and ½ inch long.

7. A method of creating a high friction surface on a trafficked pavement substrate that enables a plurality of vehicles to traverse thereover on a consistent basis, the method comprising:

preparing a dry polymer modified cement adhesive by mixing a dry polymer modified cement mix and water in appropriate quantities, wherein the dry polymer modified cement mix includes Portland cement, polymer powders and ultrafine aggregate, wherein the ultrafine aggregate has a finer granularity than aggregate typically used with cement such as the aggregate defined in ASTM C144 specification;

applying the dry polymer modified cement adhesive to the trafficked pavement surface as a thin overlay, wherein the trafficked pavement substrate can be either a concrete surface or an asphalt surface; and applying topical aggregate to the dry polymer modified cement adhesive thin overlay prior to it curing, wherein when the dry polymer modified adhesive thin overlay cures the topical aggregate is secured therein and provides the high friction surface on the trafficked pavement substrate.

8. The method of claim 7, wherein the ultrafine aggregate included in the dry polymer modified cement mix is marble dust.

9. The method of claim 7, wherein the polymer powders in the dry polymer modified cement mix are redispersible binders based on a copolymer of vinyl acetate and ethylene.

10. The method of claim 7, wherein the dry polymer modified cement mix further includes microfibers between approximately $1/16^{th}$ of an inch to 1 and ½ inch long to limit segregation, shrinkage and exothermal generation and improve workability.

11. The method of claim 7, wherein the dry polymer modified cement adhesive thin overlay is approximately 1/16 of an inch.

12. The method of claim 7, further comprising creating patterns in the dry polymer modified cement adhesive thin overlay prior to curing.

13. The method of claim 7, wherein the applying the dry polymer modified cement adhesive includes spraying the dry polymer modified cement adhesive onto the trafficked pavement surface.

14. The method of claim 7, further comprising
securing a stencil to the trafficked pavement surface prior to the applying the dry polymer modified cement adhesive, wherein the stencil forms a plurality of patterns; and
removing the stencil after the dry polymer modified cement adhesive thin overlay has cured, wherein once the stencil is removed the high friction surface includes a plurality of patterns separated by a plurality of gullies.

15. The method of claim 14, wherein the gullies are non-directional.

16. The method of claim 14, wherein the patterns are hexagons.

17. A thin high friction overlay on a trafficked pavement substrate that enables a plurality of vehicles to traverse thereover on a consistent basis, wherein the trafficked pavement substrate can be either a concrete surface or an asphalt surface, the overlay comprising:

a dry polymer modified cement adhesive formed by adding water to a dry polymer modified cement mixture including Portland cement, polymer powders and ultrafine aggregate, wherein the ultrafine fine aggregate has a finer granularity than aggregate typically used with cement such as the aggregate defined in ASTM C144 specification, wherein the dry polymer modified cement adhesive is provided directly onto the trafficked pavement substrate as a thin overlay; and topical aggregate applied to the dry polymer modified cement adhesive thin overlay prior to the dry polymer modified cement adhesive thin overlay curing, wherein the dry polymer modified adhesive thin overlay and the topical aggregate create the thin high friction overlay on the trafficked pavement substrate.

18. The thin high friction overlay of claim 17, wherein the ultrafine aggregate in the dry polymer modified cement mixture is marble dust.

19. The thin high friction overlay of claim 17, wherein the dry polymer modified cement adhesive is provided directly on the trafficked pavement substrate at approximately 1/16 of an inch thick.

20. The thin high friction overlay of claim 17, wherein the ultrafine aggregate in the dry polymer modified cement mixture enables the topical aggregate to penetrate into the dry polymer modified cement adhesive thin overlay such that a substantial portion of the topical aggregate is seated in the dry polymer modified cement adhesive thin overlay.

* * * * *